June 3, 1930.　　　L. J. STEVENSON　　　1,761,996
APPARATUS FOR LOADING AND UNLOADING ENAMELING FURNACES
Filed Oct. 18, 1926　　9 Sheets-Sheet 2

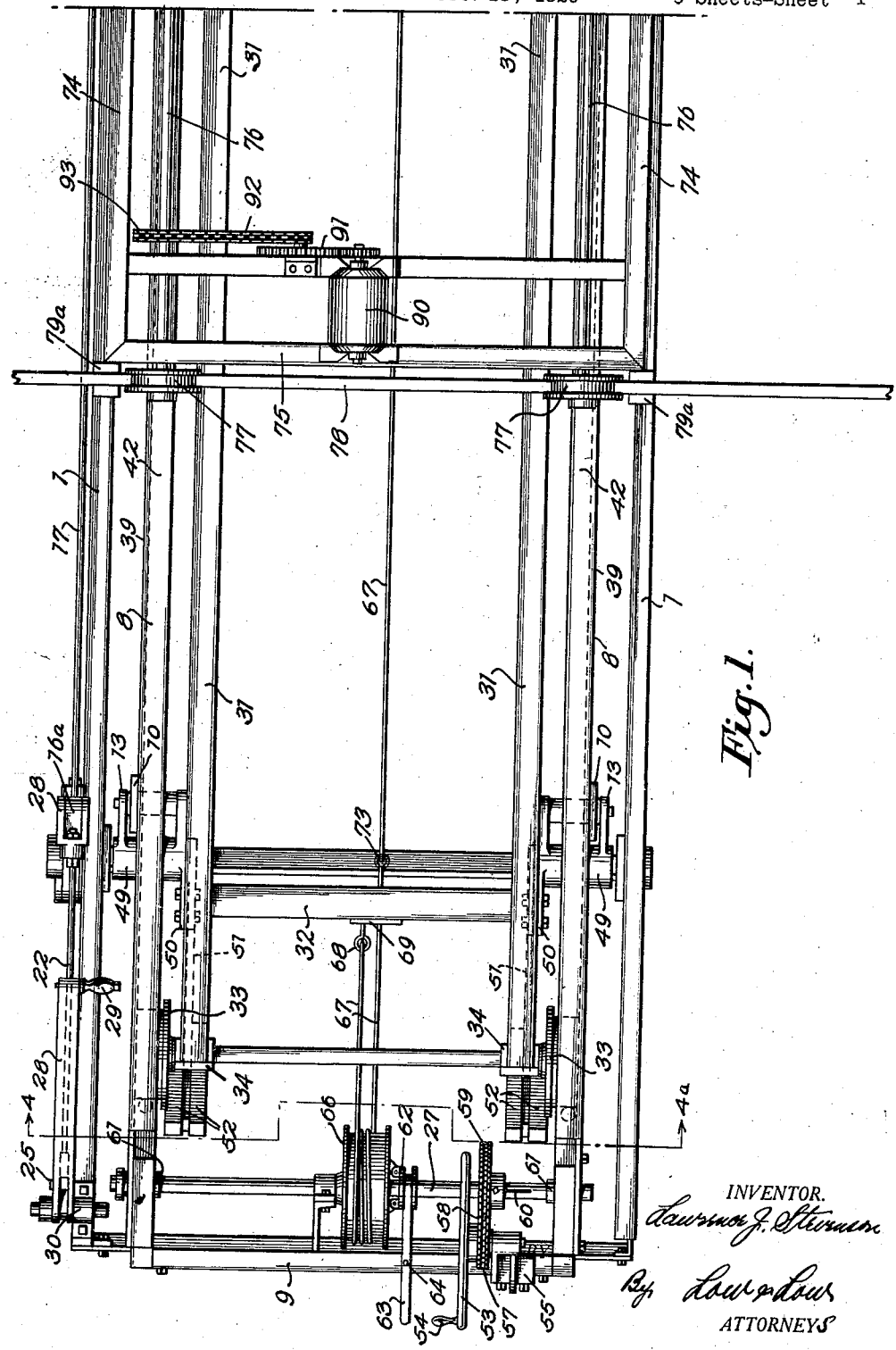

INVENTOR.
ATTORNEYS

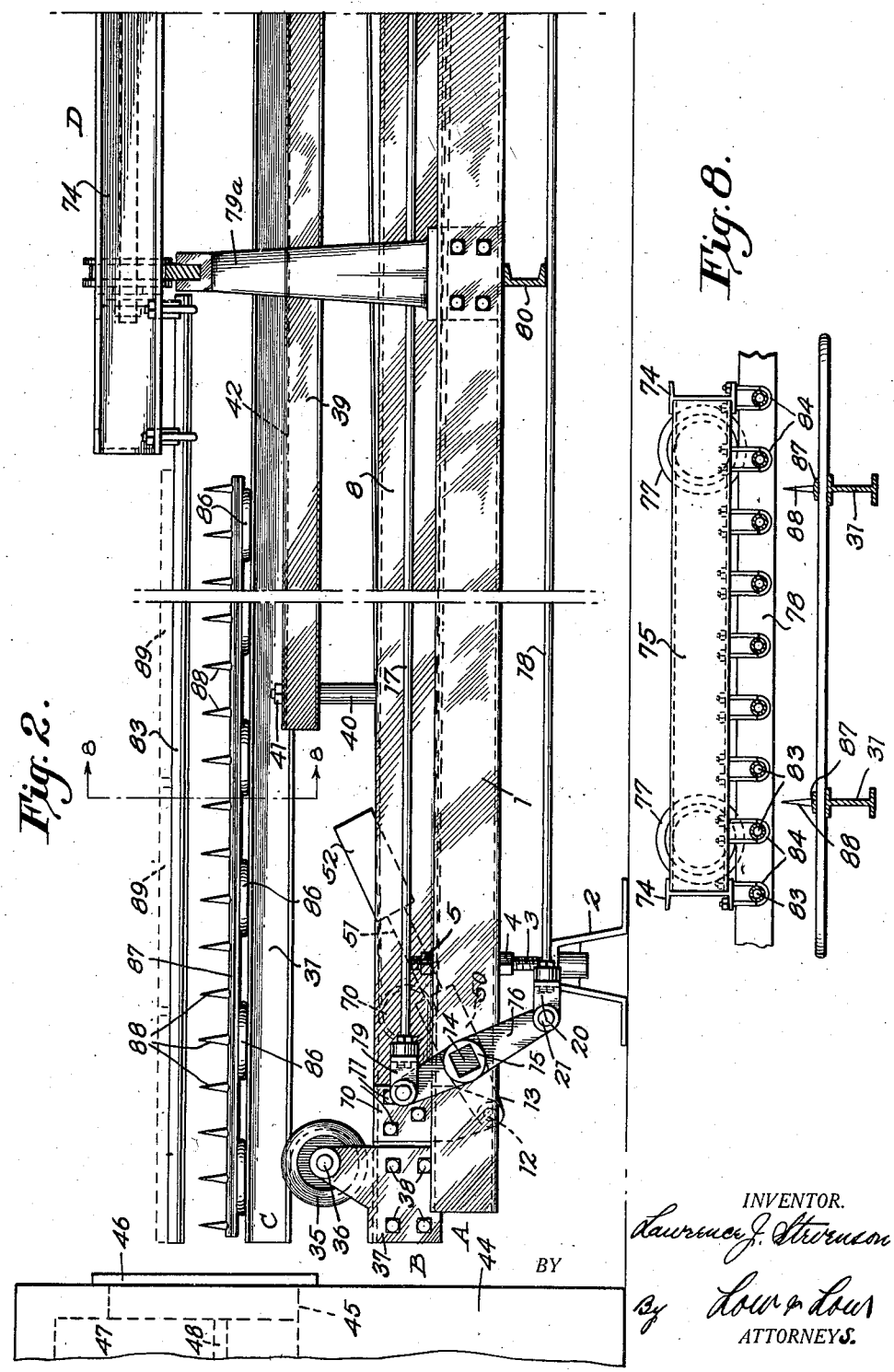

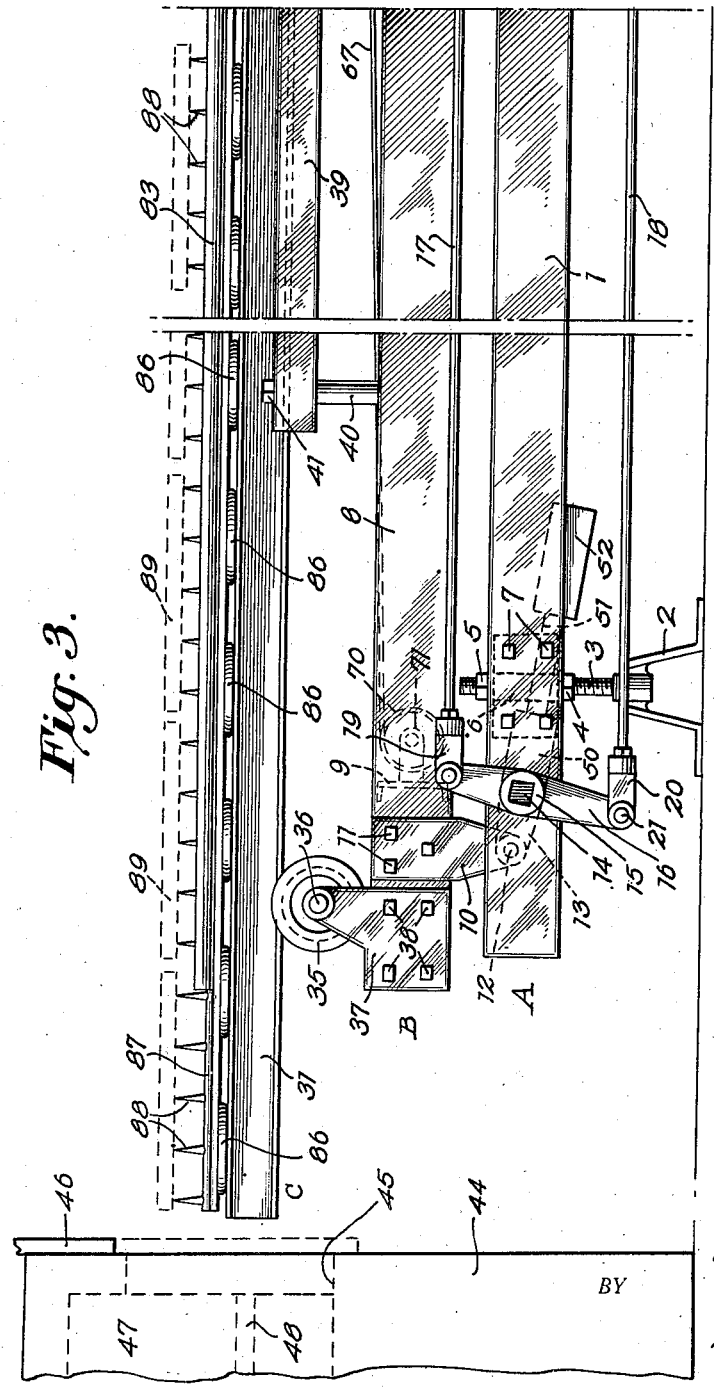

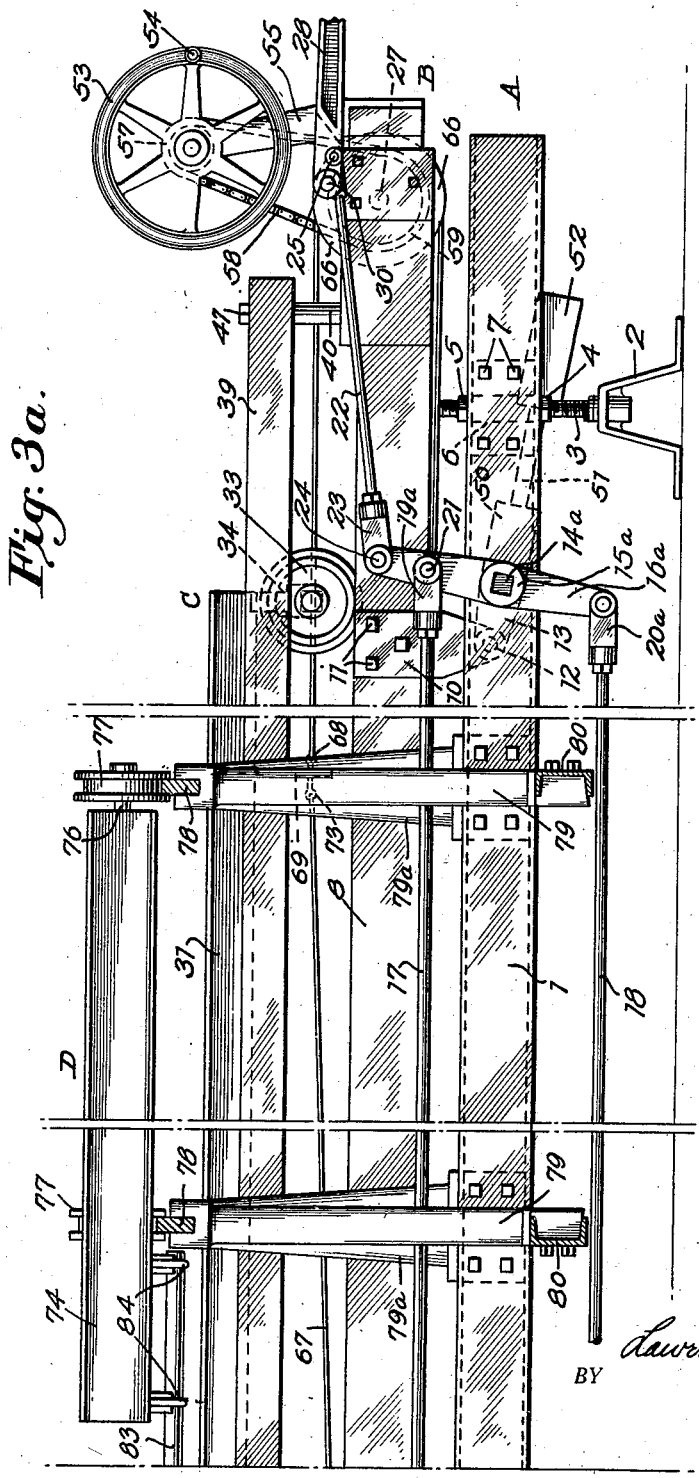

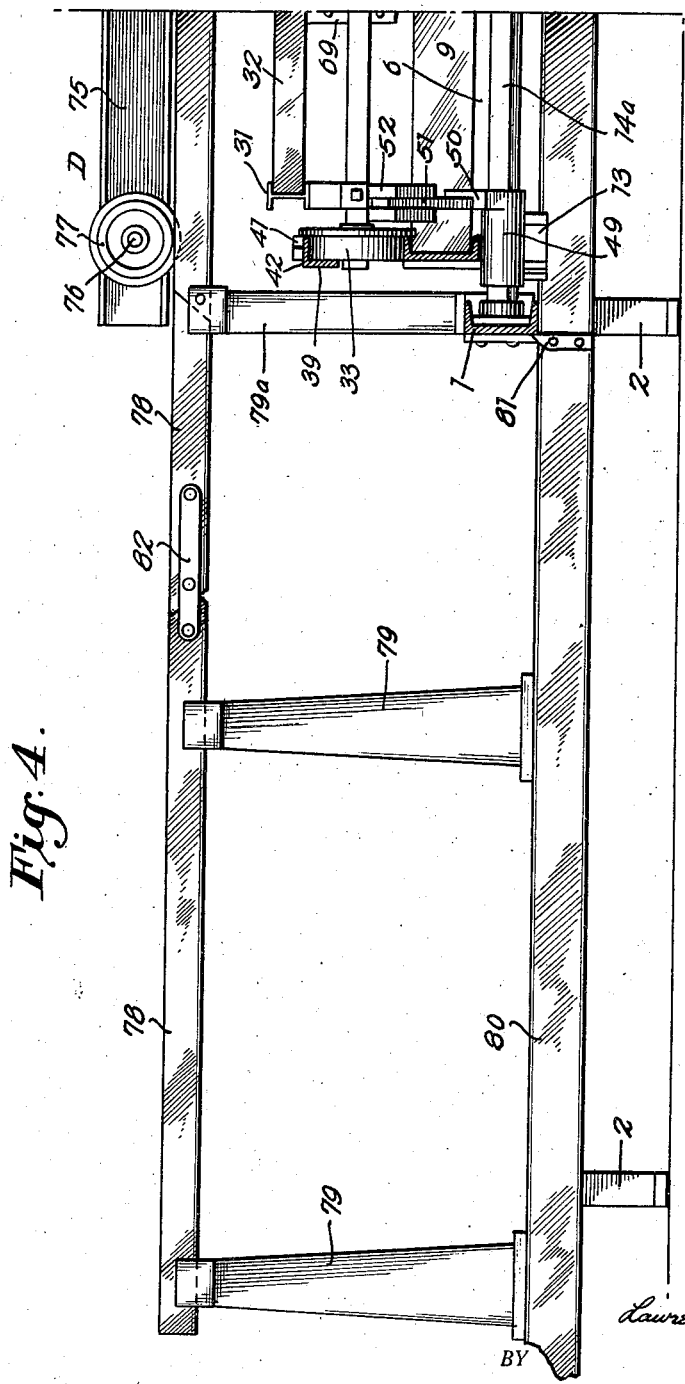

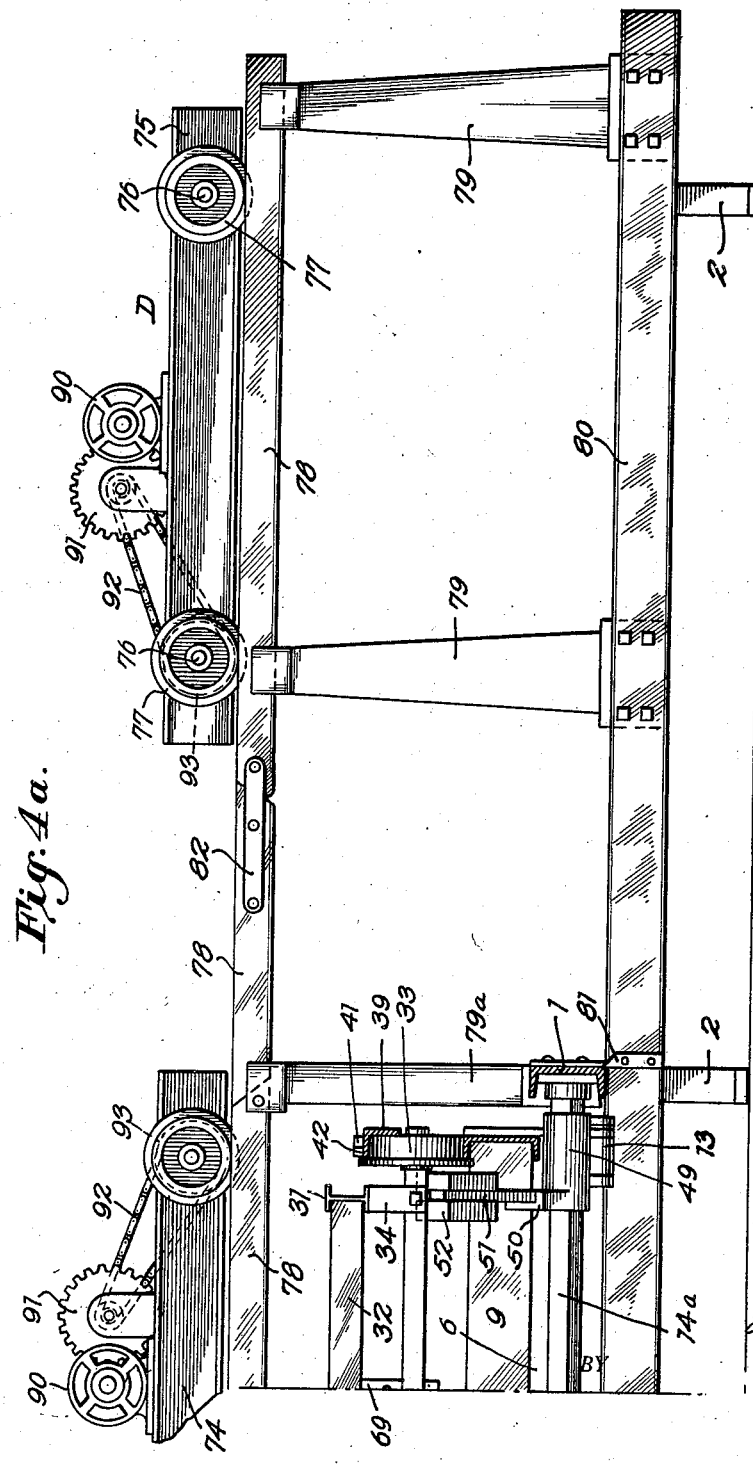

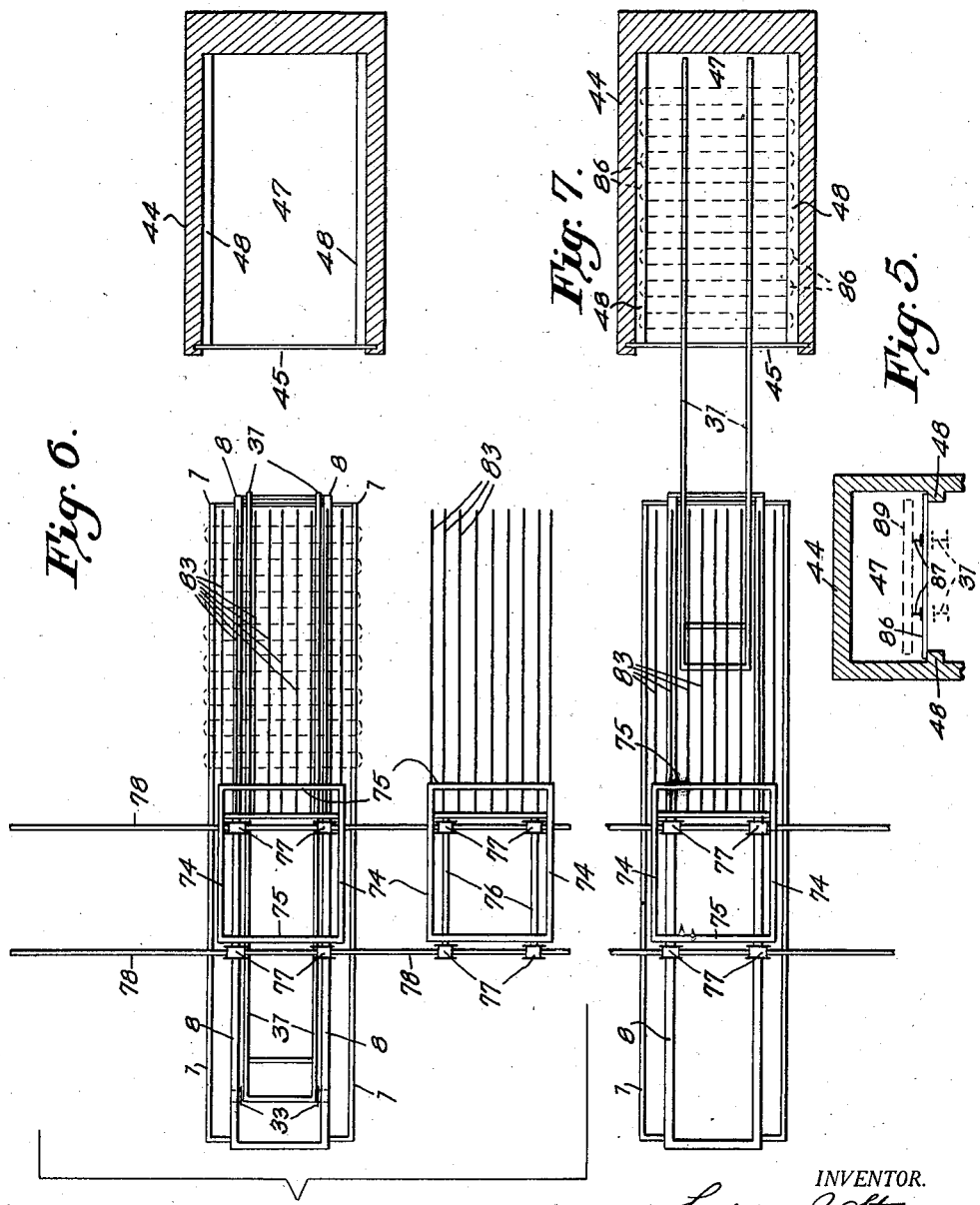

Patented June 3, 1930

1,761,996

UNITED STATES PATENT OFFICE

LAWRENCE J. STEVENSON, OF BALTIMORE, MARYLAND, ASSIGNOR TO THE PORCELAIN ENAMEL & MANUFACTURING CO., OF BALTIMORE, MARYLAND, A CORPORATION OF MARYLAND

APPARATUS FOR LOADING AND UNLOADING ENAMELING FURNACES

Application filed October 18, 1926. Serial No. 142,350.

The invention relates to a method and apparatus for charging and unloading enameling furnaces and has for its objects to provide certain new and useful improvements over similar devices heretofore used, as well as obtaining various economies and advantages which result in an appreciable saving in time, labor and fuel as well as resulting in a baked or hardened enameling product of higher or improved quality.

In machines of the general character typified by the present improvements, and designed for use in charging and unloading enameling furnaces, in order to obtain at relatively high temperatures a vitreous coating of baked and hardened enamel, certain disadvantages have been present and have hitherto been considered unavoidable. It is usual in machines of this character to provide a longitudinally reciprocable fork member immediately in front of the charging door of the furnace, and this fork member in certain machines, cooperates with one or more transversely movable carriages which are designed to be moved into proximity with the fork to enable the latter to remove a plurality of unbaked articles from said carriages, after which the articles are deposited by the fork within the heating chamber of the furnace. The fork is withdrawn from the furnace until the baking process is completed, after which the fork is reinserted to remove the baked articles and is retracted from the furnace into proximity with one of said transfer carriages to deposit the baked articles thereupon, after which said carriages are manually moved transversely from proximity to the fork and the baked articles are removed and stacked in any desired manner. The same or another of said carriages is loaded with a second series of freshly coated articles, moved into proximity with the fork and the furnace charging and unloading operation is repeated as long as it is desired to continue the baking operation.

In machines of the character above described it has been usual and necessary to first remove the article transfer carriage from proximity with the fork before projecting the latter into the furnace, or retracting the fork from the furnace with or without the baked articles supported thereupon. This movement of the transfer carriage is necessary to prevent the fork from colliding with the transfer carriage which would result in the articles being either displaced or jarred off of the fork, or displaced or jarred from the carriage. In either event breakage or damage to the articles is likely to occur and smooth and efficient operation of the apparatus is interfered with and delayed. To avoid this undesirable result it has been customary to first move the transfer carriage out of proximity to the fork to permit the latter to be shifted, and replace the transfer carriage after the shifting movement, both before and at the completion of the baking operation. These extra movements on the part of the carriage require additional time and manual labor as well as requiring the furnace door to remain open and the grate carried by the fork exposed, for a longer period, with resulting heat and fuel losses.

A further disadvantage incident to machines of this character is that the forward end of the fork member is often tilted downwardly when projected into the furnace resulting in jarring the articles and the tendency for the latter to slip forwardly with consequent faulty and uneven distribution on the supporting ledges of the furnace as well as possible loss of or damage to the articles both while in the furnace chamber and during their subsequent removal and transfer to the transversely movable carriage. In machines of this character it is highly essential that the articles be handled by the various portions of the apparatus and deposited and removed from the furnace with a minimum of jarring, and this is necessary not only because the freshly coated articles must be kept free from smears and streaks resulting from sudden displacement, but the articles must preserve their arrangement on their various supports in order to insure their free and unobstructed transfer to and from the furnace and in the various elements of the apparatus.

A still further disadvantage heretofore encountered resides in that the transversely movable carriers are required to be moved by manual effort resulting in an undue expenditure of labor and physical exertion, and this has been true to a large extent with the longitudinal reciprocation of the fork member. Furthermore, the carriers have been coupled together, thereby necessitating the same to be moved simultaneously instead of individually and requiring the expenditure of greater manual effort on the part of one or more operators. The use of transversely disposed supporting bars on the carriers in machines or apparatus heretofore employed, requires extra movement of these carriages and extra operations of the fork mechanism, as heretofore pointed out and with the stated disadvantages.

A principal object of the present invention is to provide a method and apparatus for charging enameling furnaces with freshly coated ware and removing the baked articles therefrom in rapid and continued sequence in such manner as to obviate the stated disadvantages incident to known methods and apparatus, and eliminating the fuel, heat and labor losses heretofore present in such machines. The present invention contemplates the elimination of the described extra movements on the part of the carriers and the fork proper by rendering it unnecessary to shift the carriers out of proximity to the fork prior to shifting the latter in either direction, and vice versa.

A further object of the invention is to provide a method and apparatus of the character described by which the articles are deposited and removed from the furnace evenly and simultaneously without jarring or displacement, and by which any tendency of the fork member to tilt is effectively prevented.

A further object is to provide a method and apparatus of the character described in which the transfer carriers or carriages are automatically operated by motor power instead of manually, and the fork member is reciprocated into and out of the furnace as well as elevated and lowered smoothly and with a minimum of physical exertion, or the fork may be manipulated by the use of motor power.

A further object is to provide improved means for definitely maintaining the fork member in a horizontal position while raising and lowering the same or while projecting the fork into or out of the furnace.

A further object is to provide improved means carried by the fork member for removing freshly coated articles from the carriers and depositing the same in the furnace, said means being insured against warping and undue expansion when subjected to the furnace heat and further permitting the enameling or baking heat to obtain access to the entire area of the articles or ware to be coated with porcelain enamel.

With such objects in view, as well as other advantages which may be incident to the use of the improvements, the invention consists in the method and in the apparatus for carrying the same into effect hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration. In the said drawings:

Figs. 1 and 1ª constitute a top plan view of a preferred embodiment of the machine, the enameling furnace for baking the articles being omitted. This furnace and its usual charging door is located opposite the machine or at the right hand of Fig. 1ª.

Figs. 2 and 2ª constitute together a side elevation of the machine, said view being taken looking from the upper or opposite side of Fig. 1, showing the furnace and the longitudinally reciprocable furnace charging member or fork in its lowered position.

Figs. 3 and 3ª constitute a similar view showing the fork member in its uppermost or raised position, with the fork partially projected towards the enameling furnace.

Figs. 4 and 4ª together constitute a transverse vertical sectional view on line 4—4 of Fig. 1.

Fig. 5 is a transverse vertical section through the enameling furnace and showing the manner of supporting the articles to be hardened or baked therein.

Fig. 6 is a plan view, diagrammatic in character, of the article transfer and charging apparatus constituting the invention, and illustrating the method and successive steps employed in charging the furnace with green or unbaked material and removing the baked articles from the furnace by means of the longitudinally reciprocable fork members and the transversely movable cooperating carriers.

Fig. 7 is a similar view showing the fork member projected into the furnace and in position to be again retracted without necessitating the removal of the article transfer carrier out of the path of the fork.

Fig. 8 is a transverse sectional view on line 8—8 of Fig. 2.

Figure 1A:
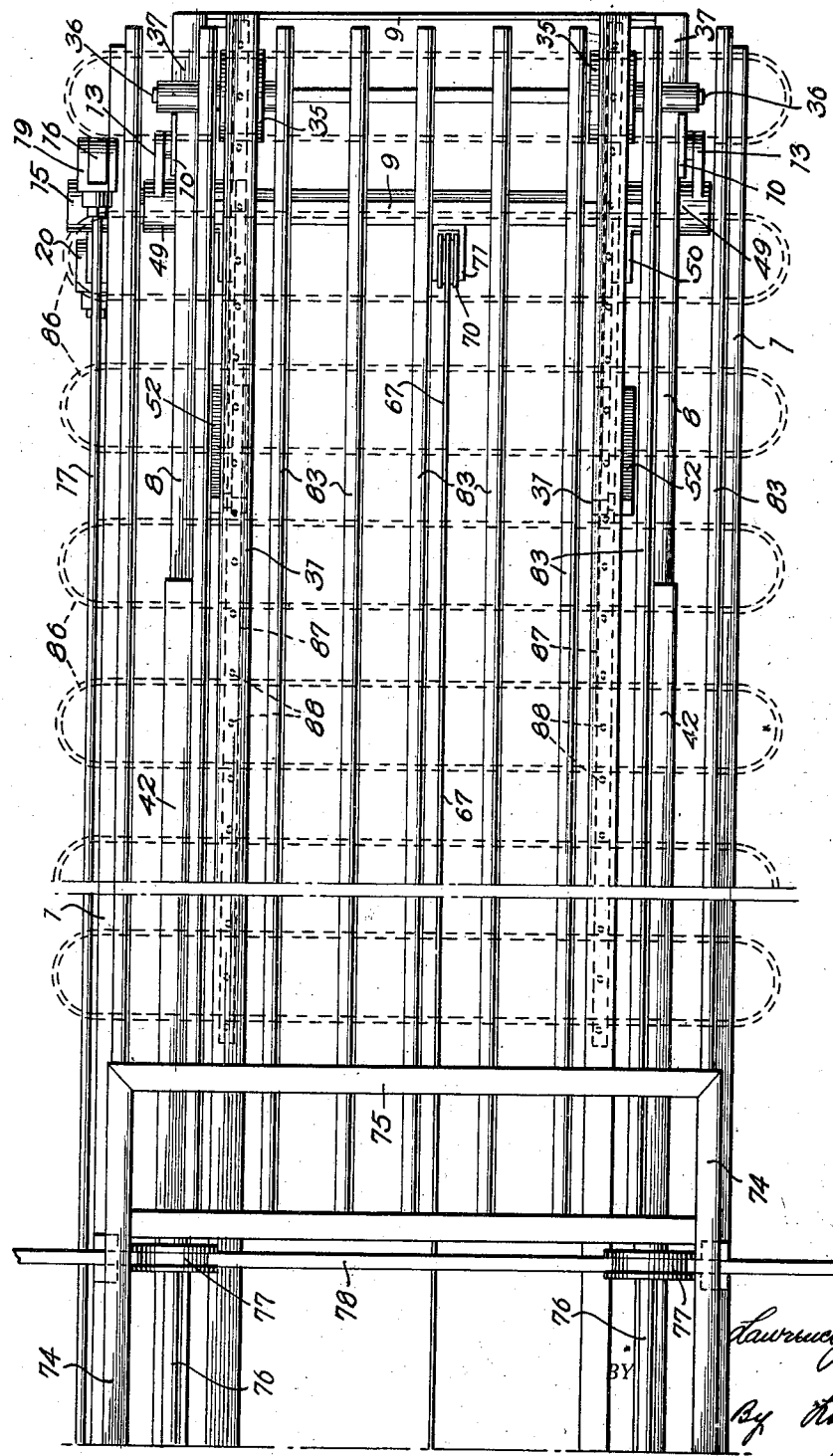

Referring to the drawings, the base A of the machine supports the longitudinally reciprocable fork member C and its frame B, as well as the transversely movable article transfer carriages D, and said base consists of a pair if horizontally disposed longitudinal channel members or beams 1, which are in turn spaced from the floor by means of front and rear supporting standards 2 carrying vertical screw members or posts 3. The channel members 1 constituting the base are vertically adjustable relative to the floor and the charging door of the furnace by means of said screw members which may be turned by their squared portions 4 and locked in adjusted position by means of lock or jam nuts 5 on the upper ends of said screw members and bearing against the top surface of the channel members 1. Suitable transverse members 6 are provided between the longitudinal channel members 1 to reinforce the latter and constitute a rigid stationary base, said transverse members 6 being bolted as at 7 or otherwise rigidly secured to the channel members 1.

The vertically movable frame B for supporting the longitudinally reciprocable fork consists of a pair of spaced horizontally disposed longitudinal side frame members or beams constituting a track support 8 to which are bolted transverse frame members or beams 9. The fork supporting frame B is mounted on the base A by means of bracket members 10 bolted or otherwise secured at 11 adjacent the four corners of the frame, each of said bracket members terminating in a depending ear portion pivotally secured at 12 to a crank lever 13, each crank lever in turn constituting part of a casting rigidly secured or keyed to front and rear transverse rock shafts 14, 14$^a$ extending between and journaled in the channel beams 1 of the base A. The rock shafts 14$^a$ are provided with round bearing portions 15, 15$^a$ in the frame and squared portions on which front and rear parallel levers or members 16, 16$^a$ are mounted to turn with the shafts. The lever members 16, 16$^a$ are connected together by upper and lower link members or rods 17 and 18 having threaded engagement at their ends with turnbuckles 19, 19$^a$ and 20, 20$^a$ which in turn are pivotally secured at 21 to the upper and lower ends of the levers 16, 16$^a$. The upper end of rocking parallel lever 16$^a$ has pivotally secured thereto a link member or rod 22 threaded at one end into a turnbuckle 23 in turn pivoted at 24 to the lever 16$^a$, and the opposite end of link 22 is pivotally secured to a stud or projection 25 on a hand lever 28 having an operating handle 29. Said hand lever is pivoted at its lower end at 30 to a suitable bracket member on the track support 8. In the normal lowered position of the fork supporting track the lever 28 is disposed in the position illustrated in Fig. 2$^a$.

Figure 2A:
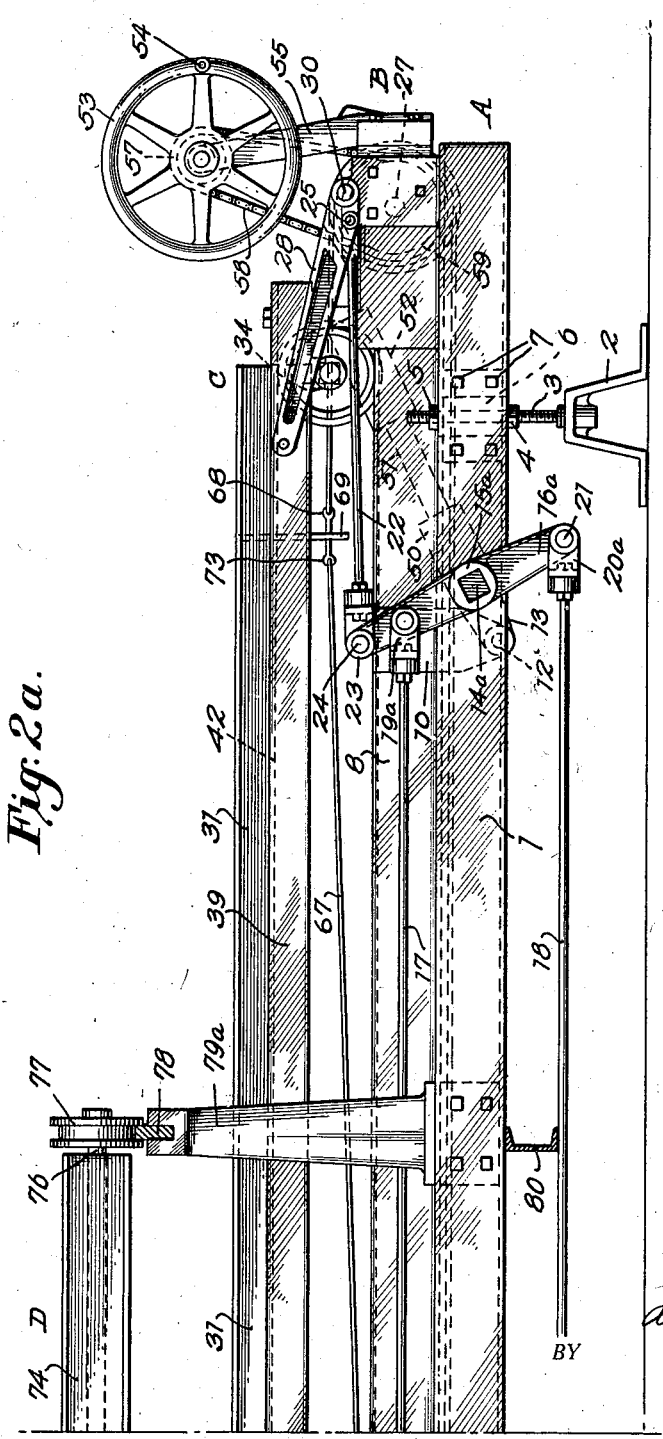

When it is desired to elevate the fork supporting frame B and the fork carried thereby, hand lever 28 is swung or rocked rearwardly from the position illustrated in Fig. 2$^a$ to the position illustrated in Fig. 3$^a$. Link 22 is thereby drawn rearwardly to rock lever 16$^a$ and this motion is transmitted to rocking lever 16 by means of the link members 17 and 18. This rocking movement of levers 16 and 16$^a$ and their respective shafts 14 and 14$^a$ elevates the frame members 8 by reason of their pivotal connection at 12 with the crank arms 13 rigidly secured to the rock shafts. This elevated position of the fork supporting frame B is shown in Figs. 3, 3$^a$. The adjustable or turnbuckle connections 19, 19$^a$, 20, 20$^a$ and 23 afford means for varying the extent of upward travel of the frame B according to and as determined by working conditions and the location of the charging door of the furnace above the floor.

The longitudinally reciprocable article-carrying member or fork C is carried by the vertically movable supporting frame B and includes a pair of aligned horizontally disposed side frame members which may consist of metallic I-beams 31 suitably connected at their rear ends by one or more transverse members or bars 32. At its rear end the fork member is supported by flanged wheels 33 suitably journaled in bearings 34 secured to the I-beams 31 and at their forward ends the I-beams 31 are guided and supported for longitudinal reciprocation on a pair of rollers 35 suitably journaled on stud shafts 36 carried by bearing or bracket members 37 which are in turn bolted or otherwise secured at 38 to the side frame members 8 of the fork supporting track frame. The flanged wheels 33 of the fork member are designed to travel upon the side frame members 8 which serve as tracks for said wheels. The fork member is illustrated in Figs. 3 and 3$^a$ as partially projected toward the furnace with the wheels 33 traveling upon the track formed by the side frame members 8. In order to insure against overbalancing and tilting of the fork with its load when the fork is moved to or approaches its projected position, guide members 39 are provided, one on each side of the machine, said guide members being supported by posts or standards 40 secured as by bolts 41 to said guide members and to the side frame members 8 of the fork supporting structure. Said guide members 39 are provided with preferably integral inwardly projecting horizontal flanges 42 which engage the upper periphery of the flanged wheels 33 of the fork member when the latter is projected into the furnace, to provide an anti-friction rolling engagement and to insure against any tilting movement of the fork, as will be clearly apparent.

The forward or outer ends of the members 31 of the fork are designed to support loosely thereon a plurality of link or loop members 86 extending transversely between the members 31. The loop members 86 are preferably formed of metal or metallic alloy of high heat resistance and fusing temperature to enable said members to withstand the extremely high temperature to which the interior of the furnace is raised when baking the enameled articles. A plurality of longitudinally disposed members or bars 87 are provided and are designed to rest loosely upon the loop members 86 supported by the arms of the fork. The bars 87 are also constructed of metal or alloy having a high capacity of heat resistance and each member is provided with a plurality of spaced upwardly projecting pins or points 88, which may be formed integrally with the bars 87, and which are adapted to support the articles to be baked in the combustion chamber of the enameling furnace 44. Any desired number of bars 87 may be provided according to the size and character of the articles to be enameled, said bars being placed in spaced parallel relation on the fork to rest loosely on and be supported by the transverse loop members 86. In the embodiment illustrated two of the bars 87 are provided extending transversely of the loop members and longitudinally of the fork, said bars being adapted to support by means of their points 88 a plurality of articles or ware 89 of rectilinear dimensions and which are intended to be coated with enamel and thereafter baked in the furnace 44 to the desired degree of hardness. For example, the articles to be baked are illustrated as consisting of sheet metal table tops which are intended to be provided with the usual coating of baked and hardened enamel. It will be understood, however, the present machine is designed and adapted to enamel a great variety of articles to be enameled and baked, such as stove stampings or stampings or castings for refrigerator parts. The machine is designed for use in handling any type of die-pressed sheet iron or metallic casting which is adapted to be suitably coated and thereafter placed in a furnace for porcelain-enameling.

The enameling furnace is indicated at 44 and may be of the usual or preferred type for this purpose. The article or ware handling mechanism constituting the present invention is disposed in front of the furnace and in longitudinal alignment with the charging opening indicated at 45, which is normally closed by a vertically reciprocable or other suitably mounted door 46. The combustion or enameling chamber of the furnace is indicated at 47 and this chamber is provided on the opposite sides thereof with opposed ledges or shoulder portions 48 which are designed to receive and support the articles to be baked within the furnace.

When it is desired to project the fork C consisting of the I-beams 31, into the furnace to deposit or remove the articles to be baked, said fork and its supporting frame B is first elevated in the manner above described from its lowered position as shown in Figs. 2, 2ᵃ to its elevated position (Figs. 3, 3ᵃ). This movement is obtained by swinging operating lever 28 as has been described. In its lowered position the supporting frame B of the fork rests upon opposed hub portions 49 on the front and rear squared shafts 14 and 14ᵃ (Figs. 1 and 4). The hub portions 49 may be constituted of integral castings having the projecting lever arms 13 and also having offset arms 50 suitably recessed to receive projecting arms 51 on which are adjustably mounted suitable counterweight castings or members 52. The counterweights are adjustable on their supporting arms so as to delicately balance the fork C and its supporting frame B in such manner that a minimum effort is required to swing the hand lever 28 to elevate or lower the fork and its supporting structure. It will be further observed that, from a comparison of Figs. 2 and 3, the position of the counterweight members 52 is such that the same, due to gravity, tend to assist in elevating the fork to its upper position, and when the fork structure is lowered the tendency of said counterweight members is to retard the downward movement of the fork and its frame in such manner that a delicately balanced elevating and lowering movement is insured, and which may be obtained by slight physical exertion on the part of the operator.

When in its elevated position (Figs. 3, 3ᵃ), the fork has been moved into alignment with the charging door of the furnace and above the shoulders 48 in the combustion chamber of said furnace. In the embodiment illustrated, the fork C, consisting of the I-beams 31, is projected longitudinally into the furnace by means of a hand wheel 53 having an operating handle 54, said wheel being journaled in a suitable bracket 55 secured to one end of the fork supporting frame C. For example, said bracket member is shown supported upon one of the transverse frame members 9 extending between the side members 8 of the fork supporting frame. The hand wheel 53 is or may be provided with a sprocket 57 which is connected by a sprocket chain 58 to a corresponding sprocket wheel 59 suitably keyed as at 60 on a transverse shaft 27 having bearings 61 in the frame member 8. A friction clutch member 62 is keyed or splined to said shaft and is provided with an operating handle 63 suitably pivoted at 64 to the transverse frame member 9. The clutch member 62 is designed to be longitudinally shifted on shaft 27 into and out of engagement with a companion friction clutch member preferably constituted of a recessed portion in a drum 66 loosely mounted on drive shaft 27. A chain or cable 67 is secured at one end at 68 to a central depending lug or bracket member 69 in turn bolted or secured to the transverse frame member 32 extending between the longitudinal members 31 of the fork C. The chain or cable 67 passes over and around the drum 66 and passes at its forward end over an idler wheel or pulley 70 journaled on a bracket 71 in turn secured to one of the transverse frame members 9 extending between the side members 8 of the fork supporting frame B. From the idler pulley 70 the cable 67 extends rearwardly and its rear end is secured at 73 to the depending bracket member 69 of the fork.

From the described structure it will be apparent that clutch lever 63 may be manually operated or shifted to establish a driving engagement between shaft 27 and drum 66. The rotation of hand wheel 53 in one direction revolves shaft 27 through sprocket wheels 57 and 59, and chain or belt 58. Drum 66 is thereby revolved to wind chain or cable 67 thereupon. The fork member C is moved forwardly by means of cable 67 to project the side members 31 and loop members 86 and bars 87 carried thereby, into the furnace chamber. During its forward movement the rear end of the fork travels smoothly by means of its flanged wheels 33 traveling upon the supporting track formed by the side members 8. The forward end of the fork is guided by and runs smoothly over the oppositely disposed idler wheels 35 also mounted on said side members 8 of the frame. For the full extent of its forward movement the fork is prevented from tilting or becoming overbalanced by means of the described continuous anti-friction engagement of the wheels 33 carried by the fork member, with the horizontal flanges 42 of the guide members 39 mounted on the fork supporting frame.

To withdraw the fork from the furnace hand wheel 53 is rotated in the opposite or a clockwise direction (Fig. 3ª) assuming clutch 62 to be engaged, and the reverse winding of cable 67 on the drum 66 retracts the fork into its normal position remote from the furnace in the same manner as when projected into the furnace by the opposite pull exerted by cable 67.

The transversely movable carriages D which cooperate with the fork in charging the furnace with fresh or unbaked articles, and in removing baked enameled articles from the furnace, are best illustrated in Figs. 4 and 4ª. The carriages D may be one or more in number, and in the present embodiment two such carriages are employed. Each carriage D preferably consists of a pair of side frame or channel members 74 suitably connected by end frame members 75, and having front and rear axles 76 carrying flanged wheels 77 designed to travel upon a pair of trackways 78 carried by supports or pedestals 79 which in turn are bolted or mounted in any desired manner upon base supports 80. The latter are suitably secured by attaching plates or brackets 81 to the base frame 1, the latter and said supports being also carried by the standards 2. The two central pedestal members 79ª may be secured at their lower ends directly to the side members 1 (Figs. 2, 3 and 4). The track members 78 carried by the pedestals 79 may be composed of individual sections pivotally connected as at 82 (Fig. 4) and said track sections may be as many as desired according to operating conditions and the distance to which it is desired to transport the unbaked articles to the furnace.

Each carriage D is provided with a plurality of outwardly projecting spaced horizontally disposed articles supporting bars 83 which may be secured as by U-bolts 84 to the side and end frame members 74 and 75 of the carriage. The bars 83 extend transversely to the direction of travel of the carriage but longitudinally with respect to the line of travel of the fork member, and the carriages are preferably designed to be independently moved transversely into alignment with the fork member in a manner to be described.

The carriages D are intended to travel under their own power when desired on the transverse rails or track members 78. For this purpose each carriage is provided with a motor 90 secured in any appropriate manner to the carriage, the armature shaft of the motor being geared with suitable transmission and reduction gearing 91. From gear 91 a sprocket chain or belt 92 passes over and drives a pulley or sprocket wheel 93 rigidly secured to one of the wheels or shafts 76 of the carriage. The motor may be energized when desired preferably from a remote source of control and suitable reversing switches are provided to permit the carriages to travel in either direction on the trackways 78. For example, an overhead trolley system (not shown) may be included and operatively connected to the motors 90 in any desired and well known manner. It is further intended that the present invention shall include automatic or motorized means for raising and lowering and reciprocating the fork C, said motorized connections being connected in any appropriate manner to the transverse drive shaft 27 and link 22, in place of the hand wheel 53 and hand lever 28 in the illustrated embodiment of the invention.

In the operation of the invention one of the carriers D, while in position at one end of the transverse trackway 78, is loaded with articles of ware freshly coated with enamel, for example with table tops 89, which are placed on the bars 83 of the carrier preparatory to baking in the furnace. The motor of the carrier is energized until the latter has been moved into a central position directly over the fork member C. At this time the latter and its supporting structure are in their normal downward or lowered position and the fork proper is in its normal retracted position, these specified locations of the elements being best seen in Fig. 2. The hand lever 28 is then moved by an operator to its rearmost position as seen in Fig. 3ª and the fork C together with its supporting structure carried by the side members 8, are elevated to their uppermost position through the link and lever elements described and assisted by the downward movement of the counterweights 52. This upward movement elevates the loops 86 and bars 87 carried by the arms 31 of the fork to bring the points 88 into contact with the table tops 89 to lift the latter from contact with the supporting bars 83 of the carriage. When this movement takes place it will be noted that the bars 87 are disposed between and parallel to the bars 83 of the carriage so as not to come in contact with the latter while removing the articles from the carriage. Assuming the furnace door 46 to be opened at this time, either manually or by suitable automatic means, hand wheel 53 is rotated or its equivalent motor mechanism energized to project the fork and its load forwardly into the furnace chamber by means of the drum 66 and cable 67 in a manner heretofore described. At the extreme projected position of the fork hand lever 28 is again swung forwardly to lower the fork and its supporting frame and deposit its load of ware in the furnace chamber. The act of lowering the fork brings the ends of the loop members into engagement with the shoulders 48 (Fig. 5) with the result that said loop members together with the bars 87 supporting the articles, are simultaneously deposited within the furnace without jarring or displacing the ware or its supporting means. In its lowered position the fork is then retracted out of the furnace by rotating the hand wheel 53 in the opposite direction and the furnace door is closed. While the baking process is in effect, the remaining carriage D is loaded with fresh articles to be baked, with the former of said carriages remaining in its adjusted position immediately above the fork as heretofore explained.

After the articles in the furnace have been baked to the desired degree of hardness, the furnace door is opened and the fork, while in its lowered position, is again projected into the furnace beneath the baked articles and the latter are removed from the supporting shoulders 48 of the furnace by elevating the fork, as will be readily understood. While in its raised position the fork is retracted thus bringing the baked articles into alignment with and directly above the first mentioned carriage D which has remained in the same position as when the freshly coated articles were first removed therefrom. It will be understood that this movement of the fork into and out of registry with the carriage D, without first moving said carriage, is of great economic value in time and heat saved, and is made possible by means of the spaced bars 83 being open at their ends to permit the passage therebetween of the parallel bars 87 having the points 88 which support the baked or unbaked articles or ware.

With the fork, carrying the baked articles, in retracted position above the first mentioned carrier D as above pointed out, the fork is lowered and the articles are deposited on the supporting bars 83 of the carriage, said fork at the conclusion of this movement being out of the path of the carrier (Fig. 2) to permit the latter to be energized by its motor to move the baked articles transversely of the fork and to the end of the trackway 78. The baked articles are removed and stacked in any desired manner and the remaining carrier D, which has been loaded with freshly coated ware to be baked, is energized and moved into registry with the now retracted and lowered fork mechanism. The fork is again raised and the operation of recharging the furnace is repeated in the manner above described as long as it is desired to permit the apparatus to remain in operation for the purpose of charging the furnace with unbaked articles and removing baked articles therefrom.

From the foregoing it will be observed that the present improvements constitute an improved longitudinally reciprocating article handling fork member which cooperates with a maximum efficiency with one or more transversely movable carriers. The structure is such that no overhead parts are present in either the fork or carriage mechanism which insures against the deposit of dirt or dust on the ware before it is burned which would otherwise cause black spots in the finished white coatings, and has been incident to structures heretofore used for a similar purpose.

What is claimed is:

1. In an apparatus for charging and unloading enameling furnaces, the combination of a vertically movable track support and a longitudinally reciprocable fork member carried thereby, said fork member comprising aligned beams parallel with said track and having flanged wheels contacting with the latter, guide members projecting upwardly from said track and having a rolling contact with the upper periphery of said wheels, rollers mounted on said track and contacting with said fork member, said rollers cooperating with said guide members for maintaining said fork in a horizontal plane during the longitudinal reciprocation of the latter, a plurality of spaced loop members having their ends loosely resting on the aligned beams of said fork, and a plurality of spaced bars disposed in parallel relation to the beams of said fork and loosely resting on said loop members, said bars having spaced upwardly projecting article supporting points adapted to receive articles to be deposited in and removed from said furnace, means for bodily raising and lowering said track and said fork, and means for longitudinally reciprocating said fork relative to said track in a horizontal plane, whereby said loop members and said bars are successively deposited in and removed from the furnace.

2. In an apparatus for charging and unloading enameling furnaces, the combination of a vertically movable track and a longitudinally reciprocable fork member carried thereby, said fork member including aligned beams disposed in parallel relation to said track, means carried by said track for maintaining said beams in horizontal alignment during the longitudinal reciprocation of the latter, a plurality of transversely disposed spaced loop members carried by and having their ends resting on the aligned beams of said fork, a plurality of bars disposed in parallel relation to the beams of said fork and loosely resting on said loop members, said bars having upwardly projecting article supporting points adapted to receive articles to be deposited in and removed from said furnace, means for raising and lowering said track and means for longitudinally reciprocating said fork, in a horizontal plane, whereby said loop members and said bars are successively deposited in and removed from the furnace.

3. In an apparatus for charging and unloading enameling furnaces, the combination of a vertically movable track support and a longitudinally reciprocable fork member carried thereby, said fork member comprising aligned beams parallel with said track and having flanged wheels contacting with the latter, guide members projecting upwardly from said track and having a rolling contact with the upper periphery of said wheels, rollers mounted on said track and contacting with said fork member, said rollers cooperating with said guide members for maintaining said fork in a horizontal plane during the longitudinal reciprocation of the latter, a plurality of spaced loop members having their ends loosely resting on the aligned beams of said fork, and a plurality of spaced bars disposed in parallel relation to the beams of said fork and loosely resting on said loop members, said bars having spaced upwardly projecting article supporting points adapted to receive articles to be deposited in and removed from said furnace, whereby provision for handling articles of varying sizes and shapes is assured.

4. In an apparatus for charging and unloading enameling furnaces, the combination of a vertically movable track and a longitudinally reciprocable fork member carried thereby, said fork member including aligned beams disposed in parallel relation to said track and having a rolling contact therewith, means carried by said track for maintaining said beams in horizontal lignment during the longitudinal reciprocation of the latter, a plurality of transversely disposed spaced loop members carried by and having their ends resting on the aligned beams of said fork, a plurality of article supporting bars disposed in parallel relation to the beams of said fork and loosely resting on said loop members, said bars having upwardly projecting article supporting points adapted to receive articles to be deposited in and removed from said furnace, whereby provision for the handling of articles of varying sizes is assured.

In testimony whereof I affix my signature.
LAWRENCE J. STEVENSON.